3,641,049
IMIDAZOLINE-2-THIONES
Jan Olof Sandstrom, Mataregranden 5, Lund, Sweden, and Per Gunnar Kjellin, Lund, Sweden; said Kjellin assignor to said Sandstrom
No Drawing. Filed Oct. 29, 1968, Ser. No. 771,610
Int. Cl. C07d 49/34
U.S. Cl. 260—309.6                                                                   4 Claims

ABSTRACT OF THE DISCLOSURE

N,N' - dialkyl - 4 - phenylimidazoline - 2 - thiones, particularly 1,3 - dimethyl - 4 - phenylimidazoline - 2-thione, is disclosed as a useful antidepressant agent. The dimethyl compound also exhibits antiviral properties against herpes simplex and vaccinia viruses.

BACKGROUND OF THE INVENTION

Field of the invention

The novel phenyl- and substituted phenylimidazoline-2-thione compounds of the present invention are useful in the treatment of central nervous system depression in mammals, including man. These compounds, particularly 1,3-dimethyl-4-phenylimidazoline-2-thione, exhibit pharmacological properties similar to known clinically effective antidepressants such as imipramine. Accordingly, on the basis of activity, these compounds can be pharmacologically classified as dibenzazepine-type antidepressants.

Prior art

The reaction between thioureas and α-hydroxyketones is disclosed by P.M. Kochergin Zhur. Obschei Khim. 31,109 3–6 (1961); cf. CA 55 23503 f. The disclosed products of the reaction can be generally described as 4,5-dialkyl (or diphenyl)-2-mercaptoimidazoles and 1-aryl-4,5-diphenyl-2-mercaptoimidazoles. Similar diphenyl substituted imidazoline-2-thiones are shown in U.S. Pat. 3,287,117 as sensitizers for photoconductors. Thioglyoxalines having an alkyl substituent on the 1-nitrogen and an acyl group on the 3-nitrogen are disclosed as antithyroid compounds in Reissue Pat. 24,505.

Dihydroxy and dialkoxy derivatives of 2-imidazolidinones are disclosed in U.S. Pat. 3,260,565.

SUMMARY OF THE INVENTION

The compounds of this invention are characterized by the formula

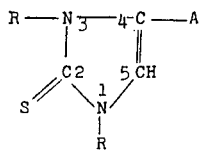

wherein R is a lower alkyl group, i.e., alkyl groups containing 1 to 4 carbons, preferably methyl or ethyl, and wherein A is a phenyl radical which can be unsubstituted or substituted with one or more substituents selected from the class consisting of halogen, preferably chlorine or bromine, nitro, amino, lower alkyl groups and lower alkoxy groups, the lower alkyl and lower alkoxy groups containing from 1 to 4 carbons.

The preferred compound is 1,3-dimethyl-4-phenylimidazoline-2-thione.

The compounds of this invention can be prepared by reacting a suitable α-hydroxyketone, such as benzoylcarbinol with a thiourea, e.g., dialkyl thiourea wherein the alkyl groups contain from 1 to 4 carbon atoms. For example, the preferred compound can be prepared from ω-hydroxyacetophenone and dimethylthiourea. Other illustrative phenacyl alcohols include mono- and disubstituted alkyl and alkoxy benzoylcarbinol such as ω-hydroxy-methyl acetophenone, ω-hydroxy-ethyl acetophenone, ω-hydroxy-methoxy acetophenone; the corresponding dimethyl, diethyl, dimethoxy, and diethoxy compounds; and compounds having one or more halogens, preferably chlorine or bromine, or nitro groups, on the phenyl ring. The phenyl substituents can be ortho, meta or para with respect to their position on the phenyl ring.

Illustrative thioureas include disubstituted compounds such as N,N'-dimethylthiourea, N,N'-diethylthiourea, N, N'-dipropylthiourea, and N,N'-dibutylthiourea.

The compounds of the present invention are useful as antidepressants. When administered to mice, per os, they are found to prevent ptosis induced by intravenous administration of reserpine. The preferred compound of this invention, 1,3-dimethyl-4-phenylimidazoline-2-thione exhibited an antidepressant effect in mice at doses as low as about 1 mg./kg., per os, when given prior to treatment with reserpine (5 mg./kg.). The test compound delayed the onset of ptosis usually associated with reserpine. The test compound did not induce excessive motor activity characteristic of monoamine oxidase inhibitors. The pharmacological effect of the test compound, therefore, is in marked contrast to the characteristics effect of a monoamine oxidase inhibitor which, when used to reverse a reserpine effect, causes the test animals to become hyperactive, often to such a degree that death follows. Accordingly, the compounds of this invention, particularly 1,3-dimethyl-4-phenylimidazoline-2-thione, are capable of counteracting depression without undue stimulation of motor activity.

In male rats, administration (intraperitoneally) of as little as about 2 mg./kg. of 1,3-dimethyl-4-phenylimidazoline-2-thione about one hour prior to treatment with tetrabenazine (35 mg./kg.) induced antagonism of the depressant action of the tetrabenazine. The test compound reversed the tetrabenazine-induced ptosis. No reversal of the behavioral effects of tetrabenazine were observed at an intraperitoneal dosage level of about 20 mg./kg. In contrast, antidepressants such as desipramine and imipramine, used as reference compounds, induced both ptosis reversal and behavioral antagonism of tetrabenazine-induced depression at dosages of about 10 and 20 mg./kg., respectively.

The preferred compound of this invention is also active as an antagonist for the hypothermia induced in mice by treatment with oxotremorine at doses as low as about 3 mg./kg., intraperitoneally, given about 30 minutes prior to administration of 0.6 mg./kg. of oxotremorine. The temperature was taken rectally about one hour after treatment with the oxotremorine.

The compound 1,3-dimethyl - 4 - phenylimidazoline-2-thione when administered orally to mice had an acute toxicity ($LD_{50}$) of 330 mg./kg.

The preferred compound, 1,3-dimethyl-4-phenylimidazoline-2-thione does not exhibit monoamine oxidase inhibitory properties in laboratory animals. At a dosage level of about 40 mg./kg., per os, no significant variation in level of mouse brain serotonin, determined by the method of Mead et al., Bioch. Pharm. 6:52, 1961, was noted. Similarly, at the same dosage level urinary excretion of 5-OH indolactic acid, determined by the method of Underfriend et al., J. Biol. Chem. 216. 499, 1955, in rats was not decreased.

The compound, 1,3-dimethyl-4-phenylimidazoline-2-thione, has been found to exhibit significant antiviral activity against vaccinia virus and herpes simplex virus. This activity was demonstrated on HeLa cells which were infected with the virus at a virus input at about 0.07 infectious units per cell. The test compound was then added to the fluid growth medium. At 48- and 72-hour intervals, the cells were examined for cytopathic effect. At the end of the 72-hour period, the cells and fluid were harvested and disintegrated in an ultrasonic oscillator. The number of vaccinia virus particles was measured by plaque titration on a chick kidney monolayer. A HeLa cell monolayer was used for the plaque titration of herpes simplex virus.

Isatin-β-thiosemicarbazone was used as a reference compound against vaccinia virus. The test compound was found to be active against vaccinia at a concentration of about 31 micrograms per milliliter. The test compound was also active against herpes simplex virus at a concentration of about 8 micrograms per milliliter. The reference compound for herpes simplex virus was 5-iodo-2-deoxyuriadine. Unifected cells were used as controls.

It was also shown that the test compound, i.e., 1,3-dimethyl-4-phenylimidazoline-2-thione, is capable of inhibiting viral multiplication during some intracellular stage of development. In this test, HeLa cells were infected with virus at an input multiplicity of about 5 infectious units per cell. After an attachment period of about 60 minutes, the test compound was added in a fluid medium. One set of culture tubes was immediately analyzed for virus. Subsequent analyses are made to determine the effectiveness of the test compound in inhibiting multiplication of the virus. It was found that at a concentration of about 6.25 micrograms per milliliter the test compound significantly inhibited multiplication of both vaccinia virus and herpes simplex virus for 24 hours.

The compounds of the present invention, particularly 1,3-dimethyl-4-phenylimidazoline-2-thione, can be administered, as an antidepressant, in amounts ranging from about 20 to about 250 millilgrams per day and more generally from about 50 to about 200 milligrams per day suitably in divided doses. Alternatively, the dosage can be based on the weight of the subject and can range from about 1 to about 5 milligrams per kilogram of body weight per day.

The compounds of this invention can be administered both orally and parenterally in accordance with conventional procedures for the treatment of depression and viral infections. They are administered in dosage units, preferably in divided dosages, containing the active ingredient in combination with a suitable physiologically acceptable carrier or excipient, many of which are well known to those in the art. The dosage units can be in the form of a liquid preparation, e.g., solutions, suspensions, dispersions, or emulsions, or they may be in solid form such as tablets, capsules or the like.

EXAMPLE 1

Preparation of benzoylcarbinol.—Acetophenone (240 ml.) was stirred into 1 liter of acetic acid. Thereafter, 102 ml. of bromine was added to the resulting mixture at a rate such that the temperature of the mixture was kept below 35° C. After 30 minutes at room temperature, the resulting mixture was heated and refluxed for a short time. Solid potassium acetate (390 g.) was added in portions and the mixture refluxed with stirring for one hour. Acetic acid (750 ml.) was removed by distillation and the residue was poured into one liter of water. The separated oil and water phases were extracted with ether (400 ml.). The ether phase was dried and distilled at a pressure of 2 mm. of mercury to give a forerun consisting of acetic acid and a fraction consisting of phenylacylacetate (259 g.—yield 73%) at a temperautre of about 120°–130° C.

The phenylacetate was mixed with 3 liters of 0.3 N hydrochloric acid and refluxed for two hours, after which the hot liquid was decanted from an oily by-product which was again extracted with a 500 ml. portion of hot water. On cooling, a small amount of oil was separated from the liquid. On further cooling, benzoylcarbinol crystallized out of solution. The benzoylcarbinol was recrystallized from 100 ml. of ethanol to give 138 grams of material melting at 84°–86° C. (yield 50%).

EXAMPLE 2

1,3-dimethyl-4-phenylimidazoline-2-thione.—The benzoylcarbinol, 136 grams, prepared as in Example 1 was refluxed together with 104 grams of N,N'-dimethylthiourea in 500 milliliters of hexanol using a Stark-Dean water separator. After three hours of reflux, 38 milliliters of water had separated. On cooling, a crystalline product having a melting point of 126° C. was separated from the hexanol solution. After recrystallization from 80 milliliters of ethanol, there was obtained 83.5 grams of 1,3-dimethyl-4-phenylimidazoline-2-thione having a melting point of 126°–127° C. (Yield—41%).

EXAMPLE 3

Substituting in the procedure of Example 1, an equivalent amount of the ortho, meta or para position isomers of methylbenzoylcarbinol, methoxybenzoylcarbinol, nitrobenzoylcarbinol, chlorobenzoylcarbinol, bromobenzoylcarbinol, ethylbenzoylcarbinol, or ethoxybenzoylcarbinol, there is obtained the corresponding ortho, meta or para position isomers of of 1,3-dimethyl-4-(methylphenyl)imidazoline-2-thione,
1,3-dimethyl-4-(methoxyphenyl)imidazoline-2-thione,
1,3-dimethyl-4-(nitrophenyl)imidazoline-2-thione,
1,3-dimethyl-4-(chlorophenyl)-imidazoline-2-thione,
1,3-dimethyl-4-(bromophenyl)imidazoline-2-thione,
1,3-dimethyl-4-(ethylphenyl)imidazoline-2-thion, or
1,3-dimethyl-4-(ethoxyphenyl)imidazoline-2-thione.

EXAMPLE 4

Substituting in the procedure of Example 1, equivalent amounts of N,N'-diethylthiourea, N,N'-dipropylthiourea, or N,N'-dibutylthiourea there is obtained 1,3-diethyl-4-phenyl-imidazoline-2-thione, 1,3-dipropyl-4-phenylimidazoline-2-thione, or 1,3 - dibutyl-4-phenylimidazoline-2-thione.

We claim:
1. A compound having the formula

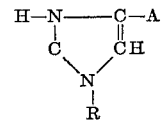

wherein R is selected from the group consisting of alkyl groups having from 1 to 4 carbon atoms, and A is selected from the group consisting of phenyl and substituted-phenyl carrying a single substituent selected from the group consisting of alkyl of from 1 to 4 carbons, alkoxy of from 1 to 4 carbons, halogen, nitro, and amino.

2. Antidepressant compounds of claim 1 wherein R is methyl.

3. Antidepressant compounds of claim 1 wherein R is methyl and A is a substituted phenyl group having at least one substituent selected from the group consisting of chlorine, bromine, methyl, methoxy, nitro, and amino.

4. The compound 1,3-dimethyl-4-phenylimidazoline-2-thione.

References Cited

UNITED STATES PATENTS 2,981,739  4/1961  Bimber _____ 260—309.6
3,505,350  4/1970  Doebel et al. _____ 260—309

HENRY R. JILES, Primary Examiner
G. T. TODD, Assistant Examiner

U.S. Cl. X.R.
424—273